Nov. 22, 1932.   P. S. PARK   1,888,736
REFRESHMENT TRAY
Filed April 15, 1930   2 Sheets-Sheet 1

Inventor
P. S. PARK.
By Jesse R Stone
Lester B Clark
Attorneys.

Nov. 22, 1932.  P. S. PARK  1,888,736

REFRESHMENT TRAY

Filed April 15, 1930  2 Sheets-Sheet 2

Inventor
P. S. PARK.

By Jesse R Stone
Lester B Clark

Attorneys

Patented Nov. 22, 1932

1,888,736

UNITED STATES PATENT OFFICE

PHOCION S. PARK, OF HOUSTON, TEXAS

REFRESHMENT TRAY

Application filed April 15, 1930. Serial No. 444,378.

The invention relates to a tray particularly adapted for engagement in an automobile or other vehicle.

In serving refreshments it is often desirable to provide a tray or support for the refreshments and containers while the persons are seated in an automobile. Various types of trays which attach to the outside of the cars and otherwise have been provided but the present invention involves a tray which is adapted to be affixed inside of the car and across the laps of the persons seated in the car.

It is one of the objects of the invention to provide a tray having extensible support members.

Another object of the invention is to provide a tray having extensible brackets thereon which are adapted to engage against the sides of the automobile body.

A still further object of the invention is to provide a tray wherein the extensible support members will be locked in extended position but are constructed to be collapsed so that the tray may be readily placed in and removed from the automobile.

It is also an object of the invention to provide a tray which may be readily and quickly inserted in or withdrawn from the automobile body.

A still further object of the invention is to provide a tray with means whereby it will automatically extend the support members when it is to be inserted in the automobile body.

The invention will be readily understood by having reference to the drawings wherein Fig. 1 shows a top plan view of one form of the invention.

Figure 4:
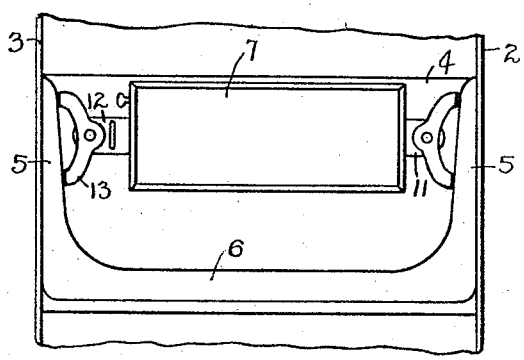
Fig. 4 is a top plan view of the tray attached inside of an automobile body (and showing its position directly above the seat of the automobile.

The invention will be readily understood by having reference to Fig. 4 where the sides of an automobile body are represented at 2 and 3. The seat cushion is shown at 4 and the side and back cushions at 5 and 6, respectively. The invention is indicated generally by the reference character 7 and shows the tray as engaging the side cushions 5. It is to be understood, however, that the tray may be placed in either the front or the rear seat of an automobile and may engage against the cushions as shown in Fig. 4 or against the side of the car or the doors as desired.

Figure 1:
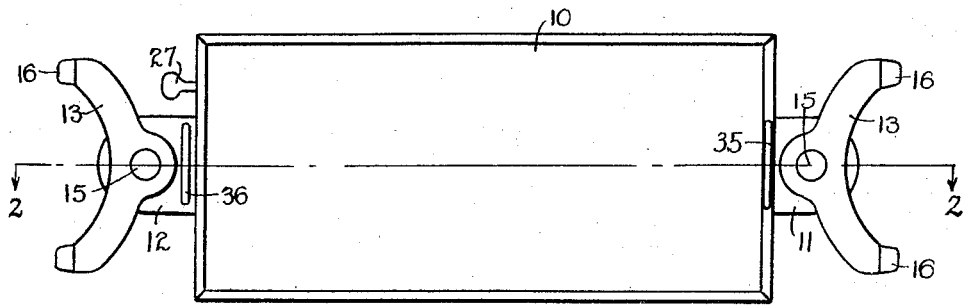

Fig. 1 shows the tray as including the body 10 and the supporting brackets 11 and 12. These brackets extend longitudinally from each end of the body 10 and are provided with a pivoted head or yoke 13 which is fastened to the brackets by means of a pivot pin 15. Suitable pieces of resilient or cushion material 16 may be attached to each of the prongs of the yoke so that the tray will not mar or injure the upholstering in the automobile. The brackets 13 on opposite ends of the tray are preferably identical in construction.

Figure 2:
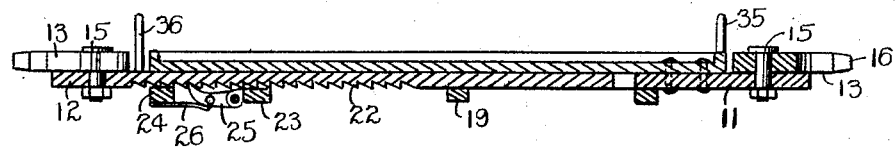
Fig. 2 shows a section taken on the line 2—2 of Fig. 1 with the support brackets in collapsed position.
Figure 3:
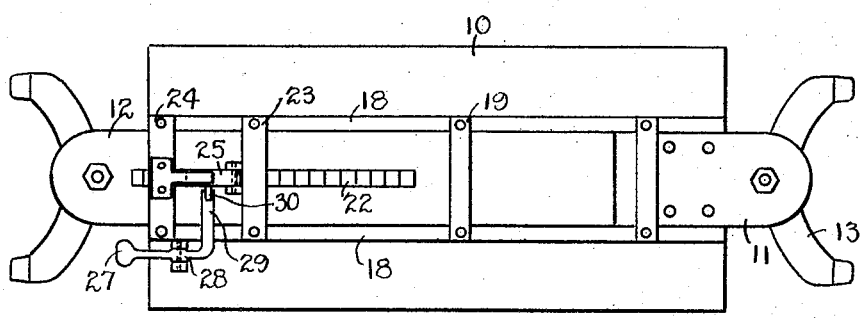
Fig. 3 shows a bottom plan view of the invention in Figs. 1 and 2.

Figs. 2 and 3 show the arrangement for extending one of the brackets so that the tray may be removably attached to the car. This structure includes the spaced guide bars 18 and the cross braces 19. The bracket 12 is shown as slidably arranged between these guide bars and cross braces. In the modification of the invention here shown a plurality of ratchet teeth 22 have been formed on the underside of the bracket 12. The cross braces 23 and 24 carry a pivot pawl 25 which is retained in uppermost position by means of a spring 26. This pawl is adapted to engage between the teeth 22 to retain the bracket 12 in any desired extended position. A suitable handle 27 is pivoted at 28 on the underside of the tray and has an extended arm 29 which engages with a pin 30 on the side of the pawl 25. In this manner it is convenient for the waiter to press upon the handle 27 and release the pawl 25 when the tray is to be removed from the automobile. When the tray is to be attached it is merely passed into the automobile and the bracket 12 drawn outwardly until it engages firmly against the side of the automobile body. The pawl 25 retains it in this position. The bracket 11 on the opposite end of the tray is rigidly affixed to the body 10 of the tray and is not adapted for extension. The yokes 13 are pivoted so that they will adapt themselves to the inclination or slope of the sides of the automobile body. With a tray such as here described it is convenient to pass the tray into the automobile so that it assumes a position across the laps of the occupants of the car. The bracket 12 is then extended and the refreshments are thus retained in a convenient position.

A handle 35 is shown on the body 10 adjacent the bracket 11 while the handle 36 is mounted upon the movable bracket 12 and can be used by the waiter or other person in extending and retracting the bracket while the weight of the tray is being carried. It seems obvious that various alterations may be made in the detailed structure of the invention which consists broadly in the idea of providing a tray with extensible support members to be placed inside of an automobile.

Figure 5:
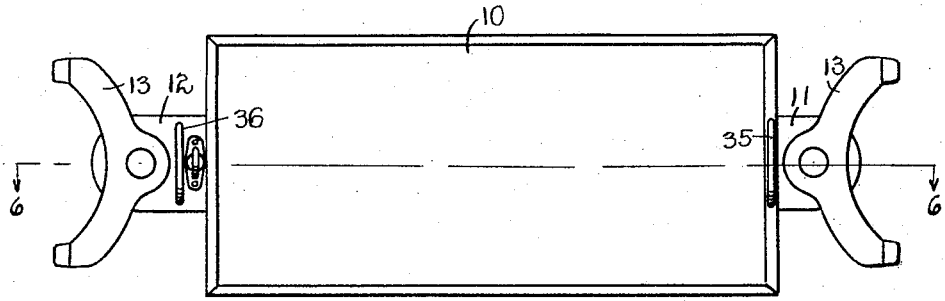
Figs. 5, 6 and 7 shows a top plan view, sectional view and bottom plan view, respectively, of a modified form of the invention.
Figure 6:
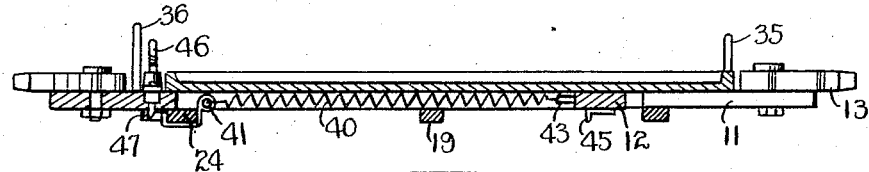
Figure 7:
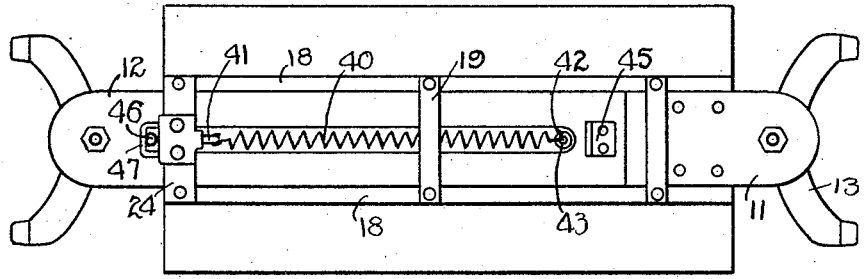

Figs. 5, 6 and 7 show a modification of the invention which is similar to the form already described but differs therefrom in that a spring 40 is provided between the guide members 18 and is connected to the body of the tray by means of a pin or bolt 41 which is suitably anchored to the cross bar 24 and is also anchored to the bracket 12 at 42 by means of a pin 43. When the bracket is in retracted position, such as shown in the drawings, the spring 40 is then under tension and normally tends to move the bracket 12 to extended position. A stop lug 45 is fixed on the bracket 12 and arranged to engage against the cross bar 19 to limit outward movement of the bracket 12. The cross bar 24 carries a hook 46 which is adapted to receive the latching pin 47 which is carried by the bracket 12. This pin 47 is of the nature of a spring pressed pin which normally extends below the lower side of the bracket 12. It is adjacent the handle 36 mounted on the bracket and in a position so that the waiter may raise the pin conveniently and release the bracket so that the spring 40 will move it to extended position. With this structure it is unnecessary for the waiter or other person to move the bracket 12 to extended position and it is only necessary that the pin 47 be released and the spring 40 will accomplish the desired movement.

When the tray is to be removed it is only necessary to push upon the tray 10 or upon the bracket 12 and move it to retracted position against the tension of the spring 40. It seems apparent that the spring 40 may be made of any desired strength and is preferably such that it will retain the bracket 12 in extended position even when the tray is loaded with refreshments. The remaining structure in Figs. 5, 6 and 7 is identical with that shown and described in the first modification.

Figure 8:
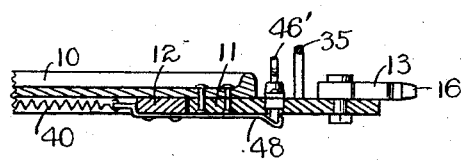
Fig. 8 is a broken sectional view of the invention showing a convenient latch releasing arrangement.

Fig. 8 shows a broken sectional view of a form of the invention which is very convenient and reliable. This form includes the tray 10, the adjustable bracket 12 and the rigid bracket 11. The spring 40 of Fig. 5 is used in this modification but the latch 46′ has been placed on the rigid bracket 11 as has the handle 35. The hook 47 has been dispensed with and a catch bar 48 has been affixed to the inner end of the bracket 12 so that it extends there beyond to engage the latch pin 46. This form is convenient in that the waiter may place one hand underneath the tray while grasping the handle 35 and latch pin 46 with the other hand. When thus held the tray may be passed in through the window of the automobile and the end of the bracket 12 placed against the opposite side of the car body. The latch 46 is lifted and the spring 40 released, the waiter exerting a pressure on the tray so that the bracket 11 will be moved gradually against the inside of the body nearest to the waiter. With this structure the waiter need not reach across the inside of the car to place the tray but will only have to reach in the window to insure proper placement.

It is believed that the invention will be readily understood and it is thought that it fills a need which is readily apparent. The occupants of the car will have convenient access to the refreshments and it will not be necessary to lean out of the car or to remain in an uncomfortable position as is necessary with trays which are now in use.

What I claim as new is:

1. A tray for use in serving articles in an automobile including a body, a pair of brackets mounted on said body, one of said brackets being extensible to engage the inside of the body, means to normally retain said last bracket in extended position whereby both brackets may engage against the inside of the automobile body and support said tray.

2. A serving tray for automobiles including a tray portion, a bracket extending from one end thereof, a slidable bracket at the other end, said brackets having a yoke pivoted at the ends thereof and adapted to engage against the inside of the automobile body to support said tray and contents.

3. A table attachment for automobiles to be supported by contacting the inside of the car body including a tray, an extensible bracket, a rigid bracket, and means to retain said extensible bracket and said rigid bracket in engagement with the opposite inside surfaces of the car body to support said tray.

4. The combination of an automobile body and a serving tray adapted to be placed wholly within the automobile and including a tray portion, an extensible bracket to engage the inside of the body of the automobile, and a second bracket on the other end of said tray portion to engage the opposite inside surface of the body whereby said brackets will support said tray.

5. A tray of the character described adapted to be supported inside an automobile body including a tray portion, brackets carried thereby to engage the inside of the body, one of said brackets being extensible to support said tray by a thrust against the sides of the automobile body, a spring normally urging said extensible bracket outwardly with sufficient thrust to support said tray, and a latch to retain said extensible bracket in retracted position, but releasable to allow said bracket to automatically move to extended position.

6. A tray of the character described adapted to be supported inside an automobile body including a tray portion, brackets carried thereby, one of said brackets being extensible to support said tray by a thrust against the sides of the automobile body and a pivoted yoke on each of said brackets to engage the side of the automobile and move to the inclination of such side.

In testimony whereof I hereunto affix my signature this 10th day of April, A. D. 1930.

PHOCION S. PARK.